United States Patent
Souza et al.

(10) Patent No.: US 7,103,788 B1
(45) Date of Patent: Sep. 5, 2006

(54) SELECTIVE SUSPENSION OF BUS DEVICES

(75) Inventors: Joseph G. Souza, Seattle, WA (US); Doron J. Holan, Seattle, WA (US); Kenneth D. Ray, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 645 days.

(21) Appl. No.: 10/003,338

(22) Filed: Oct. 31, 2001

(51) Int. Cl.
G66F 1/26 (2006.01)

(52) U.S. Cl. .................. 713/323; 713/310; 710/15

(58) Field of Classification Search ............. 710/52, 710/62, 100, 313; 713/300, 310, 320, 330, 713/340, 600, 601
See application file for complete search history.

(56) References Cited

U.S. PATENT DOCUMENTS

| | | | |
|---|---|---|---|
| 5,737,616 A | | 4/1998 | Watanabe |
| 5,752,050 A | | 5/1998 | Hernandez et al. |
| 5,784,628 A | | 7/1998 | Reneris |
| 5,799,196 A | * | 8/1998 | Flannery ............. 713/320 |
| 5,844,813 A | | 12/1998 | Tateyama |
| 5,915,119 A | | 6/1999 | Cone |
| 5,919,264 A | | 7/1999 | Reneris |
| 5,968,178 A | * | 10/1999 | Williams et al. ........ 713/340 |
| 6,085,265 A | * | 7/2000 | Kou .................... 710/63 |
| 6,085,325 A | * | 7/2000 | Jackson et al. ......... 713/300 |
| 6,092,208 A | | 7/2000 | Reneris |
| 6,092,209 A | | 7/2000 | Holzhammer et al. |
| 6,105,097 A | * | 8/2000 | Larky et al. ........... 710/314 |
| 6,141,711 A | * | 10/2000 | Shah et al. ............ 710/302 |
| 6,199,134 B1 | * | 3/2001 | Deschepper et al. ..... 710/311 |
| 6,209,088 B1 | | 3/2001 | Reneris |
| 6,243,771 B1 | | 6/2001 | Van Gasteren et al. |
| 6,272,644 B1 | * | 8/2001 | Urade et al. ........... 713/320 |
| 6,330,639 B1 | * | 12/2001 | Fanning et al. ........ 711/106 |
| 6,496,938 B1 | * | 12/2002 | Fry et al. ............. 713/322 |

FOREIGN PATENT DOCUMENTS

| | | |
|---|---|---|
| EP | 0665490 A2 | 8/1995 |
| EP | 0889387 A2 | 1/1999 |

OTHER PUBLICATIONS

Koeman, "Universal Serial Bus Understanding WDM Power Management, Version 1.1," Aug. 2000, U.S.A., pp. 1-32.

(Continued)

*Primary Examiner*—Thuan Du
(74) *Attorney, Agent, or Firm*—Senniger Powers (57) ABSTRACT

A method and system for asserting power control over one or more hardware devices connected via a bus. The invention includes a method and system for signaling and waiting to suspend a first device connected to a second device. The invention also includes a method and system for suspending a tree of devices with one or more of the devices hierarchically organized as parent devices and child devices in the tree. A controller at a root of the tree receives an idle request from one or more of the child devices and suspends all devices in the tree after receiving an idle request from each of the child devices. The invention also includes an input/output control (IOCTL) data structure for communicating the idle request.

41 Claims, 7 Drawing Sheets

OTHER PUBLICATIONS

Benini et al., "Monitoring System Activity for OS-Directed Dynamic Power Management," Proceedings of 1998 International Symposium on Low Power Electronics and Design, 1998, U.S.A., pp. 185-190.

Paleologo et al., "Policy Optimization for Dynamic Power Management," Proceedings of the 35th Annual Conference on Design Automation Conference, 1998, U.S.A., pp. 182-187.

Lu et al., "Software Controlled Power Management," Proceedings of the Seventh International Workshop on Hardware/Software Codesign, 1999, U.S.A., pp. 157-161.

Microsoft Corporation, "Supporting Power Management in Drivers," Windows 2000 Driver Development Kit, Ch. 1, 2000, U.S.A., pp. 1-86.

Microsoft Corporation, "Supporting Devices that Have Wake-Up Capabilities," Windows 2000 Driver Development Kit, Ch. 4, 2000, U.S.A., pp. 1-17.

Compaq Computer Corporation et al., "Universal Serial Bus Specification," Version 1.1, Ch. 4, 5, 7.1.3-5, 7.2.3, 9.5.2, 10.2.7, 10.5.4.6, 11.9, 1998, U.S.A., pp. 15-30, 122, 123, 139, 181, 214, 227, 253, 254.

* cited by examiner

SELECTIVE SUSPENSION OF BUS DEVICES

TECHNICAL FIELD

The present invention generally relates to the field of device power control. In particular, this invention relates to a system and method for asserting power control over one or more hardware devices connected via a bus to selectively suspend the devices.

BACKGROUND OF THE INVENTION

Peripheral hardware devices connect to personal computers via various bus architectures. For example, a Universal Serial Bus (USB) connects devices such as hubs, human interface devices (HIDs), speakers, and user-input devices. In some prior art systems, the host operating system maintains the connected devices at full power while the system is running, even if such devices are not in use at the time. Further, any hubs or controllers remain needlessly at full power when there are no non-hub devices connected to them. These limitations have power consumption and heat generation implications for desktop computers, and most especially battery power conservation implications for laptop computers.

Additionally, in some prior art systems, a bus controller for the bus accesses main memory on the host system continuously when the bus controller is not in a suspended state. This prevents the host system from placing the system processor cache or the main cache for main memory and processor in an idle state (e.g., C3). Further, some prior art systems idle the bus controller of the bus only if there is nothing plugged into the root hub ports of the bus.

The invention described below addresses one or more of these and other disadvantages.

SUMMARY OF THE INVENTION

The invention generally relates to asserting power control over one or more hardware devices connected via a bus. In particular, the invention includes signaling and waiting to suspend a first device connected to a second device. The first device sends an idle request to the second device when the first device is ready to suspend. The first device then waits to receive a call from the second device to a callback function associated with the first device to suspend the first device.

A method embodying aspects of the invention suspends a tree of devices where one or more devices are hierarchically organized as parent devices and child devices in the tree. A controller at a root of the tree receives an idle request from one or more of the child devices and suspends all devices in the tree after receiving an idle request from each of the child devices.

The invention also allows the bus, host controller, and any devices on the bus associated with a computing system such as a laptop computer to enter a low power mode even while the computing system retains full operating power. The low power mode enables battery power savings on laptop computers, especially when there are no USB devices connected to the system, and provides benefits to other computer systems with respect to power savings initiatives. The invention idles the host controller even though additional devices are plugged into root hub ports as long as the class drivers or other device drivers take advantage of this invention. Further, the invention can suspend the bus when a composite device is connected to the bus, whether the composite device is the only device or one device in a tree of devices.

In another embodiment, this invention allows the entire bus to suspend at once because all devices on the bus can register themselves as idle and ready to suspend. The invention suspends peer devices that lack independent power control. The invention abstracts the variations among different controllers away from the class driver. Further, with this invention, original equipment manufacturers can add embedded devices to their computing system while allowing the host controller to idle out and allowing the processors and caches associated with the embedded devices to enter a suspended state.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Referring now to the drawings, the present invention asserts power control over one or more hardware devices connected via a bus such as a Universal Serial Bus (USB).

Figure 1:
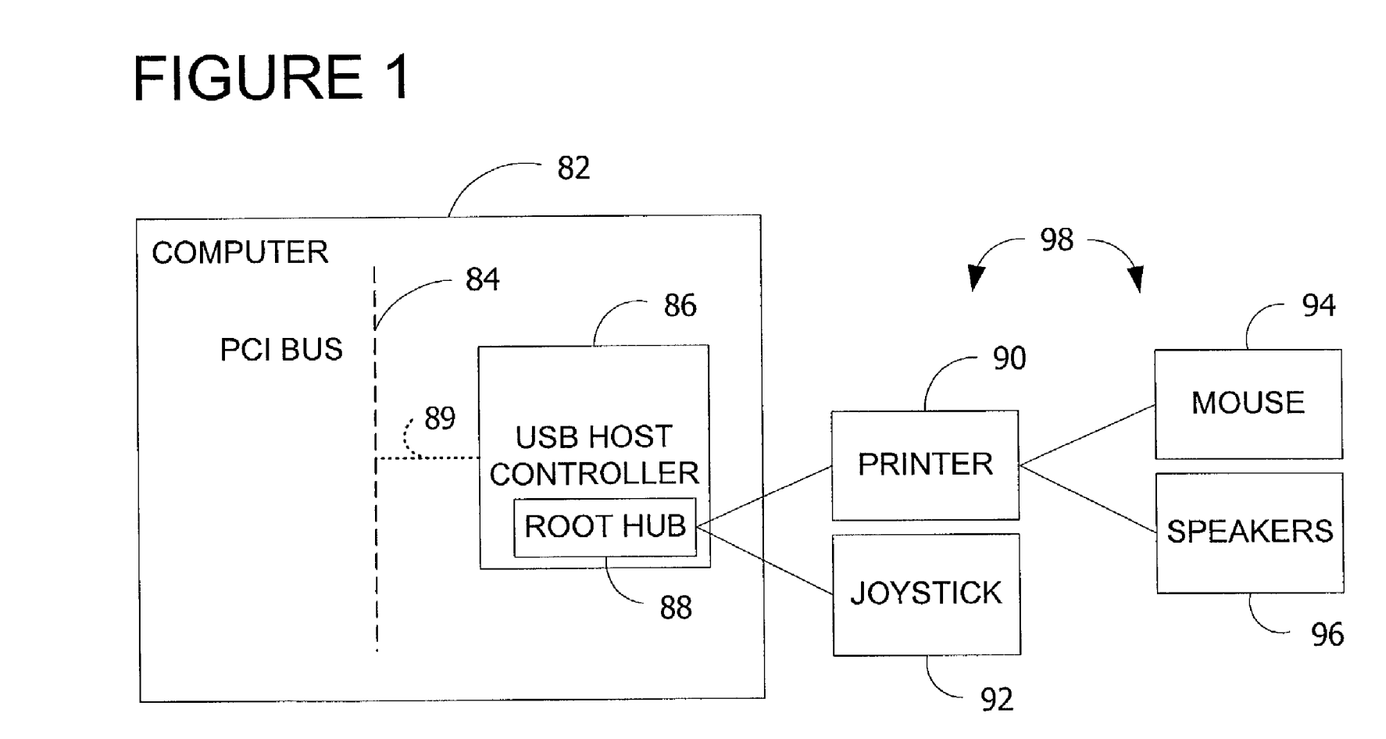
FIG. 1 is a block diagram of one embodiment of the invention illustrating a hardware model of devices connected via a Universal Serial Bus.

FIG. 1 illustrates a hardware model of devices connected via USB in block diagram form. In the embodiment of FIG. 1, a computer 82 includes an internal PCI bus 84. Peripheral components including, but not limited to, those described in connection with FIG. 2, connect to the internal PCI bus 84. For example, a peripheral component may be a composite device (e.g., a device with multiple interfaces), a root hub such as USB root hub 88, or a controller such as USB host controller 86. In FIG. 1, USB host controller 86, within the computer 82, connects to the PCI bus 84. The USB host controller 86 includes the USB root hub 88 to which peripheral devices can be connected via a USB indicated generally at 89. In other embodiments, the USB root hub 88 is external to the USB controller 86. In FIG. 1, printer 90 and a joystick 92 are connected to the USB root hub 88. In this embodiment, the printer 90 includes a hub as it has a mouse 94 and speakers 96 connected to it.

The peripheral devices in the example of FIG. 1 are hierarchically organized as nodes in a tree structure in that the mouse 94 and speakers 96 are child nodes or child devices of the printer 90. If the printer 90 is a composite device, the printing component would be a sibling to other components on the same printer 90 device. In another embodiment, a generic parent device is used as a parent of a composite device which itself has no minimal functionality. Similarly, the printer 90 and joystick 92 are child nodes of the computer 82. In this case, the controller 86, root hub 88, or computer 82 is referred to as the parent node for the printer 90 and joystick 92. In general, a hub, controller, or a generic parent can be a parent node for one or more child nodes. For simplicity reference character 98 refers to devices generally such as one or more of printer 90, joystick 92, mouse 94, speaker 96, and the like.

Those skilled in the art will note that the arrangement of the nodes in FIG. 1 is merely exemplary and that the invention is operable with any one node of a plurality of nodes in the tree structure connected to a second node. Further, while the bus in FIG. 1 is a USB, those skilled in the art will note that the invention is operable with any type of bus or network architecture that allows communication between devices or between the devices and a controller.

In some prior art systems, children of composite devices cannot be independently power controlled because the children are components of the same physical device and as such share the same common power source with one another. The invention provides independent power control of a device 98 that does not have independent power control over any connected child devices (e.g., mouse 94 and speakers 96). The implementation of the invention is a cooperative effort between driver software such as USB device drivers (e.g., class drivers) and the USB core stack. While the invention as described herein includes exemplary references to class drivers, those skilled in the art will note that the invention is generically operable with any type of device driver software (i.e., not limited to class drivers). According to the invention, USB class drivers indicate to the USB core stack that the device 98 is idle and no longer in use. When the particular device 98 is idle, the drivers may wish to put their respective devices 98 into a low power mode. The low power mode saves energy and battery power, if applicable. In addition, the invention includes a mechanism by which the USB core stack indicates to the class driver that the device 98 may be safely put into a low power mode. The interaction between the drivers and the core stack allows USB class drivers to power down their devices 98 when the drivers detect that their devices 98 are idle or not in use.

Operating in accordance with the invention, two independent devices with independent input/output control and function but without independent power control can become idle and ready to suspend independently. The two independent devices send a message to a third device to which they are both connected and suspend simultaneously. Further, host controller 86 may idle even when one or more devices are connected to one or more ports of root hub 88. Similarly, the invention includes a method for independently suspending one or more root hub ports connected to the bus. The invention also allows suspension of a bus when only a composite device is connected to the bus. Similarly, the invention operates to allow a computer to suspend a bus controller when no devices are connected to the bus.

A new input/output control (IOCTL) request permits a USB class driver to indicate to a USB core stack that the device associated with the USB class driver is ready to suspend. The USB class driver sends the IOCTL request to the USB core stack when the class driver has determined that the USB device 98 for which it is loaded is idle and no longer in use. In one embodiment, the IOCTL is sent to the USB core stack via an input/output request packet (IRP) mechanism. One of the parameters passed to the USB core stack in the IOCTL request is a pointer to a callback function within the USB class driver that is submitting the request. This callback function is the actual function within the USB class driver that will submit the request to put the USB device 98 into low power mode when called to do so.

In one embodiment of the invention, the devices 98 are connected via USB. A USB composite device (e.g., printer 90, speakers 96) is a type of USB device 98 that contains more than one interface for which more than one (or more than one instance of the same) USB class driver is to be loaded. For example, many USB speaker devices, such as speakers 96, are in fact USB composite devices, with one interface being the actual USB audio component, and the other interface being a set of human interface device (HID) controls, typically used to raise/lower the volume of the sound emitted by the speakers 96. Typically, a driver for a USB device 98 is not aware of whether it is loaded for a simple USB device, or for an interface on a USB composite device. In general, a USB composite device exposes multiple interfaces. For USB devices 98, software for controlling a HID or other USB device is also referred to as USB class driver. Similarly, for a USB, software for controlling the controller is also referred to as a USB core stack. The USB core stack includes a generic parent driver, a hub driver, and a controller driver. For example, the USB core stack may include USBCCGP.SYS as a class driver for USB composite devices and USBHUB.SYS as a class driver for USB hub devices and as a bus driver for USB in general. USBHUB.SYS creates a physical device object (PDO) for every USB device connected to the system, both simple and composite devices. In the composite device case, USBCCGP.SYS is loaded as the class driver on a PDO created by USBHUB.SYS.

Various constraints exist with conventional USB implementations. In particular, in the case of a USB composite device, a single interface cannot enter a low power mode without also requiring all the other interfaces on the same USB composite device to enter a low power mode. Further, an interface cannot be forced into a low power mode without the knowledge or permission of the USB class driver associated with that interface.

In addition, some types of USB class drivers, notably those for USB input (or HID) devices, require notification of user input or device activity in order to know when to put the USB device back into full power mode. For certain existing USB host controllers, there is a hardware bug in the controller whereby the notification feature does not function if only a single USB port is in low power mode and the entire controller hardware itself is not in low power mode. For example, if a USB mouse (e.g., mouse 94) were connected to one port of one of the suspect USB host controllers (e.g., USB host controller 86), and there was another USB device connected to a second port of the same controller, then if the class driver for the USB mouse were to put the device into a low power mode, the USB class driver would not be made aware of subsequent device activity (i.e. end-user moved the mouse or clicked a mouse button). Thus, the USB class driver for the USB mouse would not set the device to full power mode. The effects of this hardware bug to the end-user would appear that the USB mouse had become inoperational. Due to these buggy USB host controllers, another constraint when working with USB is that USB class drivers loaded for USB devices cannot be allowed to put the USB device for which the driver is loaded into a low power mode based on a unilateral request from the USB class drivers.

Figure 4:
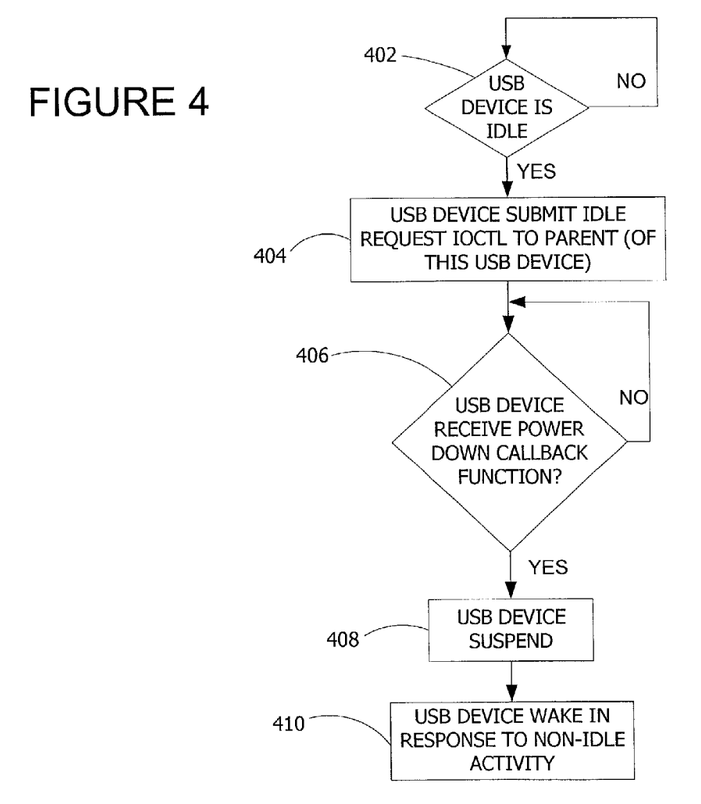
FIG. 4 is a flow chart of one embodiment of the invention illustrating operation of driver software for controlling a child USB device.
Figure 5:
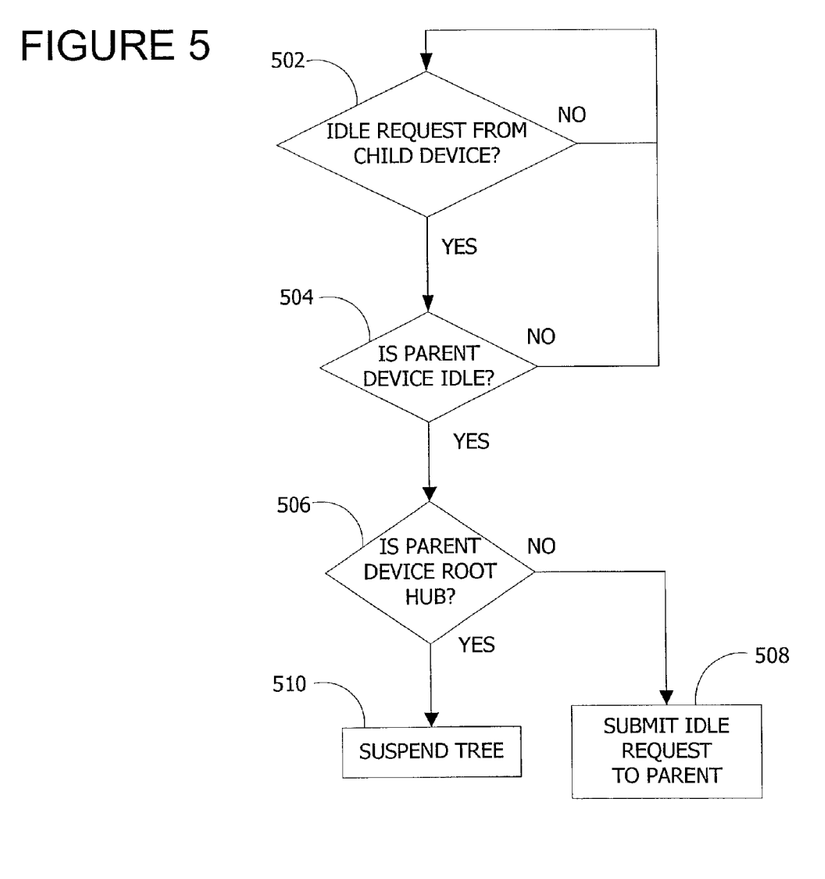
FIG. 5 is a flow chart of one embodiment of the invention illustrating operation of driver software for controlling a parent USB device.

Operation of the driver software according to the invention is illustrated and described in connection with FIGS. 4 and 5. In FIG. 4, the driver software supports a USB device (e.g., a HID) acting as a child device in a tree of hierarchically organized devices. In FIG. 5, the driver software supports a USB composite parent device or USB hub device in a tree of hierarchically organized devices. The driver software of the invention includes both aspects of the software as illustrated in FIGS. 4 and 5.

Figure 2:
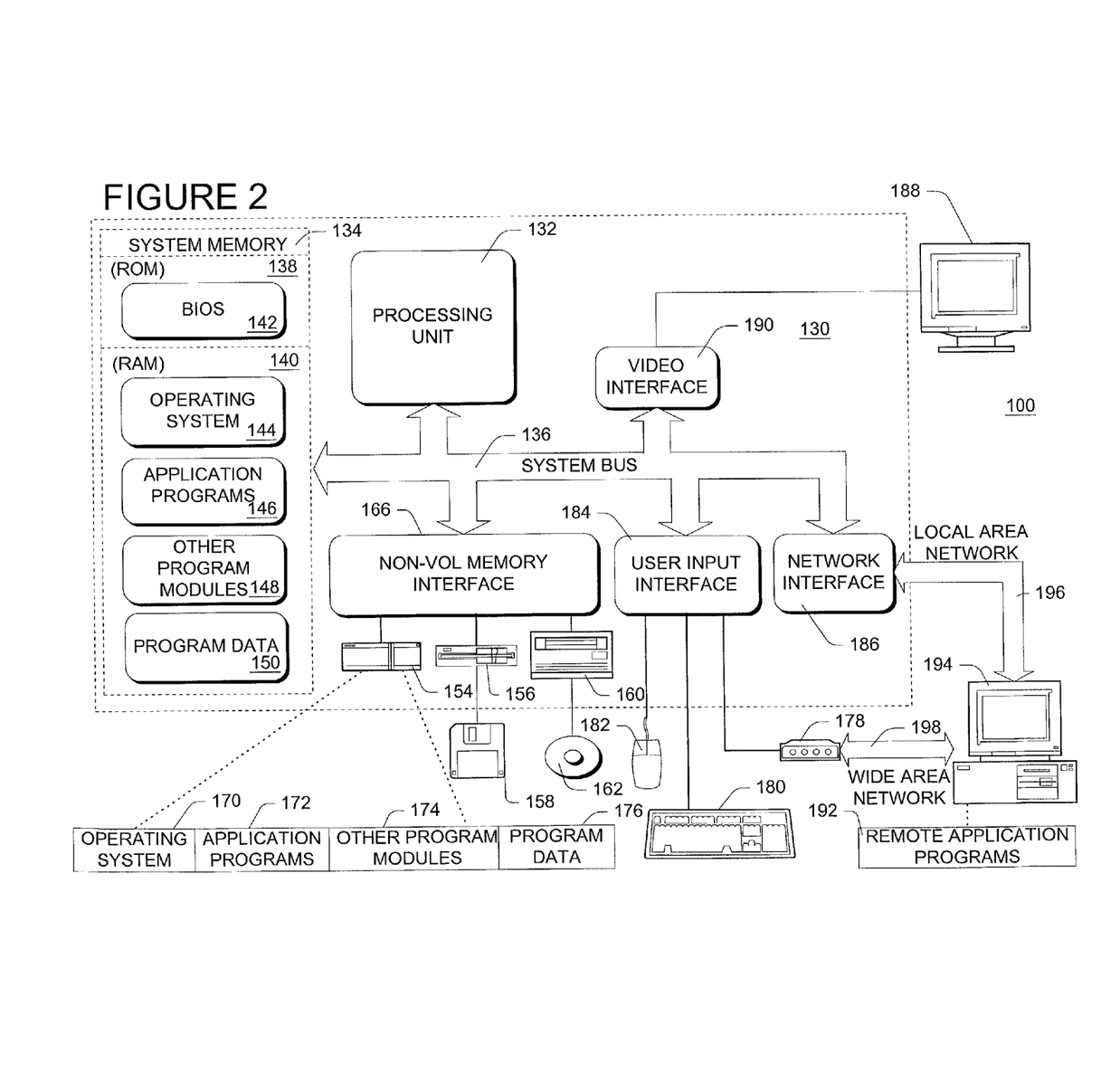
FIG. 2 is a block diagram of one embodiment of the invention illustrating an exemplary computing system environment on which the invention may be implemented.

Referring now to FIG. 2, a block diagram illustrates one example of a suitable computing system environment 100 on which the invention may be implemented. The computing system environment 100 is only one example of a suitable computing or operating environment and is not intended to suggest any limitation as to the scope of use or functionality of the invention. Neither should the computing system environment 100 be interpreted as having any dependency or requirement relating to any one or combination of components illustrated in the exemplary computing system environment 100.

FIG. 2 shows one example of a general purpose computing device in the form of a computer 130. In one embodiment of the invention, a computer such as the computer 130 is suitable for use in the other figures illustrated and described herein. For example, a computer such as the computer 130 is suitable for use as computer 82.

Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 2 illustrates operating system 144, application programs 146, other program modules 148, and program data 150.

The computer 130 may also include other removable/non-removable, volatile/nonvolatile computer storage media. For example, FIG. 1 illustrates a hard disk drive 154 that reads from or writes to non-removable, nonvolatile magnetic media. FIG. 1 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 2, provide storage of computer readable instructions, data structures, program modules and other data for the computer 130. In FIG. 2, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 2 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184 or other appropriate mechanism. In a networked environment, program modules depicted relative to computer 130, or portions thereof, may be stored in a remote memory storage device (not shown). By way of example, and not limitation, FIG. 1 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Figure 3:
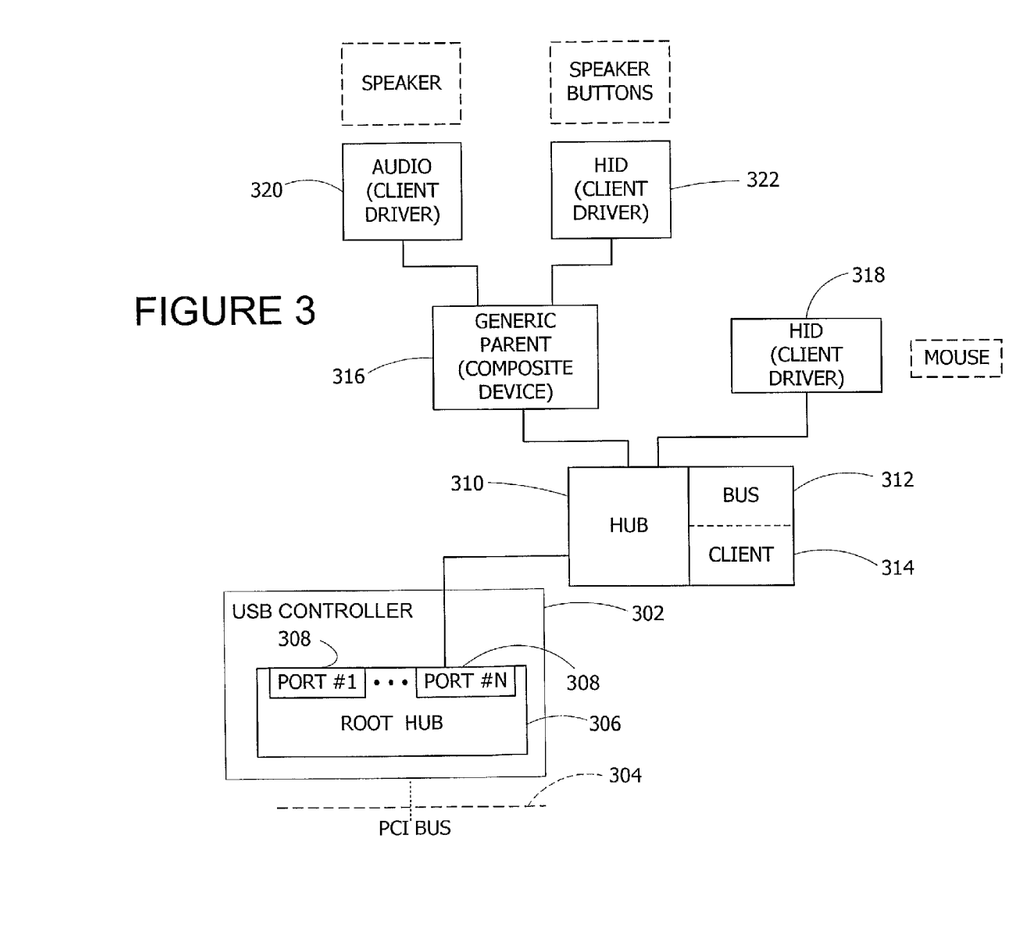
FIG. 3 is a block diagram of one embodiment of the invention illustrating a software model of devices connected via a Universal Serial Bus.

Referring next to FIG. 3, a block diagram illustrates a software model of devices connected via USB such as those illustrated and described in connection with FIG. 1. The software model of FIG. 3 shows the software components associated with an exemplary device configuration. The device configuration in FIG. 3 is different from the device configuration in FIG. 1. In FIG. 3, the hardware devices shown in phantom are associated with the software components shown proximal to the devices.

In this embodiment, USB controller 302 connects to a PCI bus 304 associated with a computer (such as computer 130).

The USB controller 302 includes a root hub 306. The root hub 306 includes one or more ports 308 indicated by Port #1 through Port #N. A hub 310 connects to one of the ports 308. Software for the hub 310 includes a bus driver 312 and a client driver 314. A generic parent (or other composite device) 316 and a HID 318 connect to the hub 310 as child devices or nodes of the hub 310. Software for the HID 318 includes a client driver. In the exemplary embodiment of FIG. 3, the HID 318 is associated with a mouse. The generic parent 316 has two child devices: an audio component 320 and a HID 322. Software client drivers are separately associated with the audio component 320 and the HID 322. In this example, the audio component 320 is associated with a speaker. Further, the HID 322 is associated with one or more speaker buttons.

Referring next to FIG. 4, a flow chart illustrates exemplary operation of driver software for controlling a child USB device, such as HID 322. The driver software includes a method for signaling and waiting to suspend a USB device (e.g., a generic parent or a hub device) such as described in connection with FIGS. 1 and 3. Driver software associated with the USB device continually determines at 402 whether the USB device is idle. The driver software submits an idle request or otherwise signals to the parent device (e.g., parent 316) of the USB device at 404 if the driver software determines that the USB device is idle or otherwise ready to suspend. For example, the driver software sends the request to its physical device object in software. In one embodiment, submitting or sending the idle request includes transmitting an IOCTL request from the USB device to the parent device of the USB device. In one embodiment, transmitting the IOCTL request includes transmitting an input/output request packet (IRP) comprising the IOCTL request from the USB device to the parent device of the USB device. For example, the USB device may be a USB host controller and the parent device of the USB device may be a computer. In this example, the USB host controller signals the computer that the USB host controller is ready to suspend. The computer can subsequently suspend the USB host controller, even if no other devices are connected to the USB host controller. That is, the client driver for the root hub that wishes to idle sends an idle request to the physical device object (PDO) for the root hub. The PDO then instructs the client driver to suspend the root hub.

In one embodiment, the USB device has an active state and an idle state. In this example, the USB device is ready to suspend when in the idle state. The invention contemplates other embodiments in which the USB device may wish to suspend even though the USB device is not completely idle. For example, the USB device may be performing operations that do not require full power. As such, the USB device can continue performing the operations even while entering a low power mode or other suspended state. In an embodiment in which the USB device has one or more child nodes (see FIG. 5 below), the USB device is ready to suspend when the USB device is idle and each of the child nodes of the USB device is ready to suspend. In this example, each of the child nodes of the USB device would have sent an idle request to the USB device indicating their readiness to suspend.

After submitting the idle request, the driver software waits at 406 for its power down callback function to be called from the parent device. After the power down callback function is called from the parent device, the driver software for the USB device executes the power down callback function to suspend the USB device at 408. After non-idle activity, the driver software wakes the USB device at 410. The USB device, any one or more of a plurality of child nodes of the USB device, the parent node of the USB device, or software associated with the controller (e.g., application programs) may perform the non-idle activity that signals the USB device to wake. For example, if the USB device is a pointing device such as a mouse, then the non-idle activity could be movement of the mouse. Similarly, if the parent node is the controller and one or more of the devices are speakers, then software executing on the computer associated with the controller may create the non-idle activity by playing music over the speakers. Waking the devices includes resetting the idle requests such that the devices are free to submit new idle requests.

In an embodiment where the devices are connected via USB, once a USB device (and the entire USB device tree) has been suspended, there are at least two methods by which the device (and subsequently the entire USB device tree) may be "awakened" and put back into full power mode. The first method is that any USB class driver may put its child device into full power mode by submitting the appropriate set power request for the device. The second is via "remote wake" activity on any USB device that supports and had previously been enabled for remote wake before the device was put into low power mode. In each of these cases, the action taken will have the effect of putting the entire device tree into full power mode, and the USB class drivers for the child devices are then free to submit new idle requests again in the future when they determine that their child device or interface is idle and no longer in use, and the entire cycle begins once again.

That is, once suspended, a device can be awakened in at least one of two ways. First, waking may occur via resumption of signaling for remote wake-capable devices (i.e., a wait/wake IRP completes successfully). Typically, the device is set to a fully operational power state (e.g., power state D0) by the function driver's wait/wake IRP completion routine. A wait/wake IRP is used to arm the device for remote wake. Second, waking may occur via a new open request initiated by client software. During the waking process, any idle request messages are reset or otherwise cancelled.

In one embodiment of the invention, a driver may cancel the idle request for its child device or interface by sending, prior to execution of its callback function, a cancel request to the parent device of the child device when the child device is no longer ready to suspend. Generally, the cancel request is sent by the child device after sending the idle request. The controller (e.g., the USB core stack) cancels any suspend transition currently in process in response to the cancel request and cancels any other outstanding idle requests for any other device in the device tree.

If the cancel request is sent after suspension, the controller considers the cancel request to be non-idle activity that requires waking the entire device tree.

The USB device and the parent device are connected via a communications medium. The communications medium includes, but is not limited to, any of the networks or bus architectures described in connection with FIG. 2. Such bus architectures include a hierarchical parallel bus, a wireless bus with tree-like connectivity, and a USB. For example, the nodes discussed in connection with FIG. 4 may be devices connected via USB. In this example, a USB hub and/or a USB controller also suspend when the other devices suspend. Further, a computer can suspend the USB controller even when no other devices (internal or external to the computer) are connected to the bus.

The invention includes one or more computer readable media having computer-executable instructions to perform the method illustrated in FIG. 4.

In one embodiment, communication between devices occurs via the software representations of the devices internal to the operating system. For example, when the controller receives an idle request, it is the software device object for the controller that receives the idle request. Those skilled in the art will note that communication may also occur via electrical signaling between the physical hardware devices. Further, those skilled in the art will note that the parent and child devices may be logically different, but not physically different, for the purposes of control and function. For example, the devices may include an embedded hub and two embedded devices, or a composite device with two independently controlled functions.

Referring next to FIG. 5, a flow chart illustrates operation of driver software for controlling a parent USB device (e.g., parent 316). The parent USB device (e.g., a generic parent or hub device) has one or more child devices (e.g., audio 320 and HID 322) connected to the parent USB device. The driver software for the parent USB device repeatedly loops at 502 to determine whether an idle request has been received from each child device. If an idle request has been received from each child device, the driver software determines at 504 whether the parent USB device itself is idle. The driver software returns to determining at 502 if the parent USB device is not idle. If the parent USB device is idle, the driver software determines at 506 whether the parent device is a root hub. If the parent USB device is not the root hub, the parent USB device propagates the received idle requests at 508 by submitting an idle request to a parent device (e.g., hub 310) of the parent USB device. In one embodiment, the submitted idle request includes all the idle requests received from the child devices. If the child devices have child devices subordinate to the parent USB device in the tree, then the submitted idle request includes all the idle requests submitted by each of the subordinate child devices. In this manner, the idle requests are propagated from each device in the tree to the root hub or other controller at a root of the tree.

Figure 6:
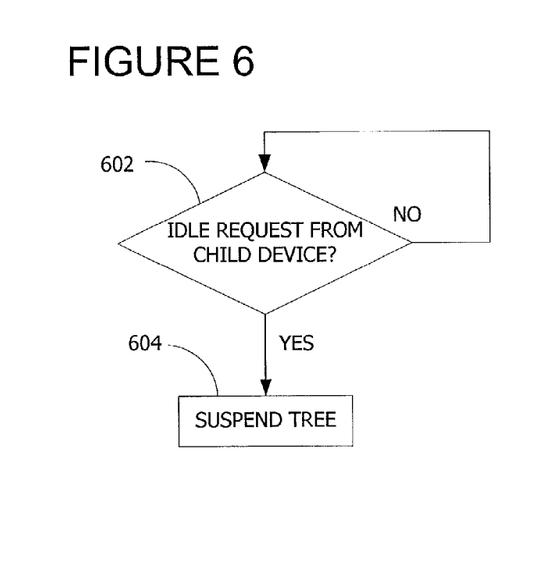
FIG. 6 is a flow chart of one embodiment of the invention illustrating operation of controller software for suspending a tree of devices.

The parent USB device suspends the tree of devices at 510 if the parent USB device is the root hub (see FIG. 6). In the embodiment where the devices are connected via USB, the root hub manages power for the devices in the tree.

Those skilled in the art will note that the order in which the idle determinations are made is not limited to that illustrated in FIG. 5. The determinations of whether an idle request has been received from each child node and whether the parent USB device is idle can occur in any order so long as both determinations are satisfied before the tree is suspended or the parent USB device propagates the idle request to the parent device of the parent USB device. That is, propagating the idle request generally includes transmitting the received idle request from a first device to a second device (such as a parent of the first device) if the first device is ready to suspend and if the first device has received an idle request from each of any child devices of the first device. Propagating the idle request includes inductively traversing the tree structure from the first device to the controller. Specifically, propagating the idle request includes determining whether the first device has received an idle request from each of the child nodes of the first device. The driver software waits to receive an idle request from each of the child nodes if an idle request from each of the child nodes has not been received. The driver software submits an idle request to the second device if the first device has received an idle request from each of the child nodes.

The invention includes one or more computer readable media having computer-executable instructions to perform the method illustrated in FIG. 5.

Referring next to FIG. 6, a flow chart illustrates operation of controller software for suspending the tree of devices. In an embodiment where the devices are connected via USB, FIG. 6 illustrates operation of software for the root hub (e.g., root hub 306) that manages power for the devices in the tree. In other embodiments, the controller software may be associated with a component at a root of the tree other than the root hub.

With regard to FIG. 6, the tree includes one or more devices hierarchically organized as child devices and parent devices in the tree. In particular, the root hub has one or more child devices connected to the root hub and organized in a tree structure. The controller software (e.g., the USB core stack) receives idle requests from the child devices. The controller software for the root hub repeatedly loops at 602 to determine whether an idle request has been received from each child device. If an idle request has been received from each child device, the controller software suspends the tree of devices at 604.

In one embodiment, the idle requests received from the child devices include propagated idle requests from child devices further subordinate in the tree structure. Suspension occurs by each parent in the tree calling the power down callback function of each of its child devices. This occurs through the tree via the route taken by the idle requests received from the child devices and the propagated idle requests. This propagates through the tree in that the driver software for each child device in the tree receives a call to its callback function from the parent device of the child device and the callback function then executes to suspend the child device. Suspension of each child device includes execution of the callback function to put the child device into a low power mode or other suspended state.

In an alternative embodiment, the root hub or other controller receives a single idle request from each of the child devices connected to the root hub where the received idle request does not include idle requests from any further subordinate child devices. In response to receiving all the idle requests from the child devices, the root hub suspends all devices in the tree by reverse propagation of the power down callback function. That is, the controller software for the root hub calls the power down callback function of each of the child devices of the root hub, the driver software for each child device then calls the power down callback function of each of its child devices, etc. In this manner, each device in the tree is suspended. This embodiment assumes that the driver software for each parent device is aware of the power down callback function specific to the driver software for each of any child devices of the parent device.

The invention includes one or more computer readable media having computer-executable instructions to perform the method illustrated in FIG. 6.

Figure 7:
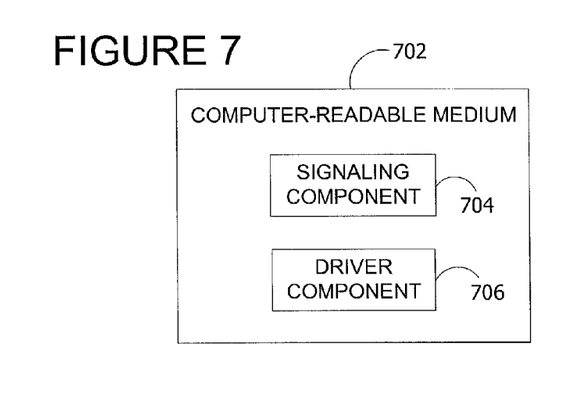
FIG. 7 is a block diagram of one embodiment of the invention illustrating a signaling component and a driver component associated with driver software for controlling a child USB device in a tree structure.

Referring next to FIG. 7, a block diagram illustrates a signaling component 704 and a driver component 706 associated with driver software for controlling a HID as a child device in a tree structure. While the child device in FIG. 7 is described as a HID, those skilled in the art will note that the child device may be any bus device (e.g., any USB device). The tree includes one or more devices hierarchically organized as parent devices and child devices. In one embodiment, the parent devices and child devices are connected via USB. One or more computer-readable media 702 associated with the HID have computer-executable components for signaling and waiting to suspend the HID. The components include signaling component 704 and driver component 706. The signaling component 704 sends an idle request from the HID to a parent device of the HID when the HID is ready to suspend. The idle request propagates through the tree from the parent device to the controller or the root hub device. Further, if the HID has at least one child device, the signaling component 704 receives an idle request from the child device and sends the received idle request to the parent device.

In one embodiment, the idle request can be canceled by the HID if sent prior to suspension of the HID. In this embodiment, the signaling component 704 sends a cancel request from the HID to the parent device in response to non-idle activity by the HID. The cancel request propagates to the controller or root hub device and the idle request sent by the signaling component 704 is subsequently cancelled. If sent after suspension of the HID, the cancel request is considered by the controller or parent device to be non-idle activity requiring waking of all the devices in the tree.

The driver component 706 waits for its callback function to be called from its parent device to suspend the HID. The signaling component 704 receives a call to its callback function from the controller in response to the propagated idle request. The driver component 706 suspends the HID in response to execution of the callback function called by the signaling component 704. In one embodiment, the callback function executes a power down function to power down the HID. Further, the power down function may include a low power function for putting the HID into a low power mode. The driver component 706 wakes the HID in response to activity by the HID, a signal from the parent device, or a signal from software associated with the controller.

Figure 8:
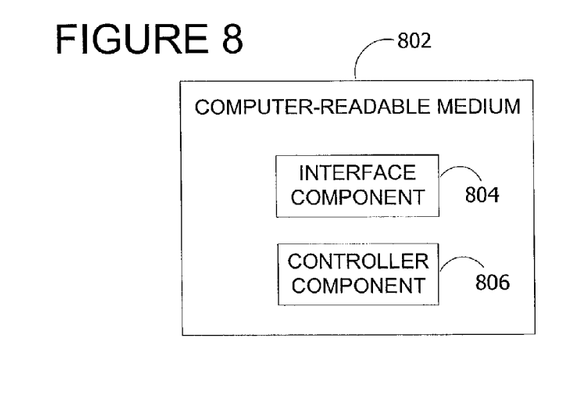
FIG. 8 is a block diagram of one embodiment of the invention illustrating an interface component and a controller component for asserting power control over hardware devices.

Referring next to FIG. 8, a block diagram illustrates an interface component 804 and a controller component 806 associated with a controller. Those skilled in the art will note that some or all of the functionality of the controller described generally herein and with particular regard to FIGS. 7 and 8 may be performed by a root hub device acting as a child of the controller. One or more computer-readable media 802 have computer-executable components for asserting power control over a tree of devices by a controller at a root of the tree. The one or more computer-readable media 802 are associated with the controller. The tree includes one or more devices hierarchically organized as parent devices and child devices in the tree. In one embodiment, the parent devices and child devices are connected via USB. The components include interface component 804 and controller component 806. The interface component 804 receives an idle request from one or more child devices. The controller component 806 suspends all devices in the tree after receiving an idle request from each of the child devices. The controller subsequently wakes the devices in the tree in response to activity by the controller or any of the devices or both.

Figure 9:
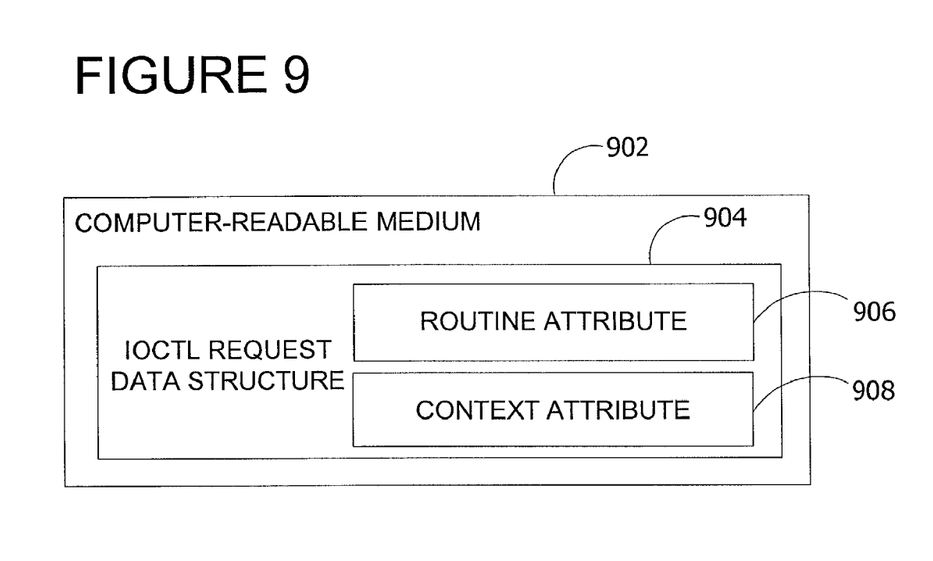
FIG. 9 is a block diagram of one embodiment of the invention illustrating an IOCTL idle request.

Referring next to FIG. 9, a block diagram illustrates an IOCTL idle request data structure. A computer-readable medium 902 stores a data structure 904 representing an idle request embodied as an IOCTL request. The data structure 904 includes a first field and a second field. The first field stores a routine attribute 906 representing a callback function. For example, the routine attribute 906 is a pointer to a function in the child driver that is to be called by the parent when the parent desires to indicate to the child that it is safe to power down its device. The second field stores a context attribute 908 representing a callback context. The callback context is passed to the callback function when called and provides an environment for executing the callback function. As described herein, a first device transmits an idle request to a second device via the data structure 904 when the first device is ready to suspend. The callback function executes to suspend the first device in response to the transmission of the idle request as described in connection with FIG. 4 and FIG. 5.

The first device has one or more child nodes organized in a tree structure. Further, the first device has an active state and an idle state. The first device is ready to suspend when each of the one or more child nodes of the first device is ready to suspend. In one embodiment, the first device and the second device are connected via a Universal Serial Bus.

An example of the data structure 904 in FIG. 9 is shown below.

```
typedef VOID (*USB_IDLE_CALLBACK) (
    PVOID Context
);
typedef struct _USB_IDLE_CALLBACK_INFO {
    USB_IDLE_CALLBACK IdleCallback;
    PVOID IdleContext;
} USB_IDLE_CALLBACK_INFO,
*PUSB_IDLE_CALLBACK_INFO;
```

Those skilled in the art will note that the devices described herein include, but are not limited to, devices external to the computer and devices embedded in the computer. For example, the devices may be USB-compliant devices embedded with a laptop computer. Using the invention, the laptop computer permits a cache and processor(s) associated with the embedded USB devices, associated with the laptop, or associated with another embedded device (e.g., a controller) to enter a suspended state (e.g., C3).

The following USB-specific example illustrates the invention. When a USB class driver determines that the USB device for which it is loaded is idle and no longer in use, the USB class driver sends an IRP containing an IOCTL idle request to the USB core stack to indicate to the USB core stack that the USB class driver for the device wishes to put the device into a low power mode. The IOCTL idle request is referenced as IOCTL_INTERNAL_USB_SUBMIT_IDLE_NOTIFICATION. The IOCTL idle request is sent at an interrupt request level (IRQL) of PASSIVE_LEVEL. When the USB core stack receives this request, the USB core stack driver notes that the child device is idle. The USB core stack, bus, or port driver sets the appropriate error status such as STATUS_SUCCESS in a variable such as Irp->IoStatus.Status. The USB core driver then traverses the list of all child devices to determine if all the USB class drivers for all other child devices have already requested to put their child devices into a low power mode. If the USB core driver determines that indeed all USB child devices have been requested to enter a low power mode by the USB class drivers loaded for each device, the USB core stack then submits an idle request to the parent device of these USB child devices. The parent device may be a USB generic parent device if the child device is a USB composite device. Similarly, the parent device may be a USB hub if the child device is a simple USB device. The parent USB generic or hub device is idle if all of its child devices are idle.

Once the idle requests are propagated through the tree of USB devices and an idle request is submitted for the USB root hub device, the USB root hub device then calls the callback of its loaded class driver (USBHUB.SYS). Each USB parent, USB composite, or hub device subsequently calls the callback of each of the USB class drivers loaded for each of the USB child devices or interfaces. All such drivers request to put their USB device or interface into low power mode, and thus the entire tree of USB devices and USB root hub are put into low power mode. When the USB root hub is put into low power mode, the USB host controller is then subsequently put into low power mode as well. If the USB devices or interfaces support remote wake up and have no IRP_MN_WAIT_WAKE request pending, the callback routines for these devices or interfaces should submit an IRP_MN_WAIT_WAKE request to the USB core stack before turning off the device or interface. Alternatively, the function driver submits a Wait/Wake IRP to the USB driver stack once it becomes clear that this IRP will be required, rather than waiting to do this in the callback routine.

Additionally, the hub driver completes the idle request with a status code indicating success if the device can be set to a fully operational power state (i.e., D0). This informs higher-level drivers that the device is no longer idle. If, however, the device has been removed or stopped, the hub driver completes the idle request IRP with an appropriate error code.

If the function driver cancels the idle request IRP, the hub driver will complete the IRP with an error code. When a function driver's completion routine detects that the hub driver completed the idle request IRP with an error code other than STATUS_POWER_STATE_INVALID, the function driver attempts to turn on the device. In one embodiment, the hub driver does not guarantee that the device is in a powered state whenever it completes an idle request IRP with an error.

In accordance with one aspect of the invention, a method provides for signaling and waiting to suspend a first device. The first device is connected to a second device via a communications medium. The method includes sending an idle request from the first device to the second device when the first device is ready to suspend. The method further includes waiting, by the first device, to receive a call from the second device to a callback function associated with the first device to suspend the first device.

In accordance with another aspect of the invention, a method provides for suspending a tree of devices. The tree includes one or more devices hierarchically organized as parent devices and child devices in the tree. The tree further includes a controller at a root of the tree. The method includes receiving, by the controller, an idle request from one or more of the child devices. The method further includes suspending, by the controller, all devices in the tree after receiving an idle request from each of the devices in the tree.

In accordance with yet another aspect of the invention, one or more computer-readable media have computer-executable components for signaling and waiting to suspend a device in a tree of devices. The tree includes one or more devices hierarchically organized as parent devices and child devices. The tree has a controller at a root of the tree. The components include a signaling component for sending an idle request from at least one child device to a parent device when the child device is ready to suspend. The idle request propagates through the tree from the parent device to the controller. The components also include a driver component for waiting to receive, by the child device, a call from the controller to a callback function associated with the child device to suspend the child device.

One or more computer-readable media embodying aspects of the invention have computer-executable components for asserting power control over a tree of devices by a controller at a root of the tree. The tree includes one or more devices hierarchically organized as parent devices and child devices in the tree. The components include an interface component for receiving, by the controller, an idle request from one or more child devices. The components also include a controller component for suspending, by the controller, all devices in the tree after receiving an idle request from each of the child devices.

In yet another embodiment of the invention, a computer-readable medium stores a data structure representing an idle request. The data structure includes a first field and a second field. The first field stores a routine attribute representing a callback function. The second field stores a context attribute representing a callback context. A first device transmits an idle request to a second device via the data structure when the first device is ready to suspend.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

The invention claimed is:

1. A method for signaling and waiting to suspend first devices, said first devices and second devices associated with a computer, said first devices having a suspend status independent of a suspend status of said second devices, said first devices being connected to a root hub via a communications medium, said first devices comprising a plurality of nodes organized in a tree structure, said first devices comprising child nodes of the root hub, said method comprising:

receiving, by the at least one of the first devices, an idle request from a child node of said at least one of the first devices, said at least one of the first devices having one or more child nodes in the tree structure;

determining via a driver of the at least one of the first devices when the at least one of the first devices is ready to be suspended, said at least one of the first devices is ready to be suspended only when all of the one or more child nodes thereof is ready to be suspended;

propagating an idle request from the driver of the at least one of the first devices to the root hub when the at least one of the first devices is determined to be ready to be suspended, said sending being independent of an idle requests sent by the second devices, said propagating the idle request comprises:

determining whether the at least one of the first devices has received an idle request from each of the child nodes thereof;

waiting to receive an idle request from each of the child nodes if an idle request from each of the child nodes has not been received; and submitting an idle request to the root hub if the at least one of the first devices has received an idle request from all of the child nodes;

waiting, by the driver of the at least one of the first devices that sent the idle request, to receive a call from the root hub to a callback function associated with the device; and executing by the driver the callback function to suspend the at least one of the first devices that sent the idle request while maintaining a state associated with each of the other first devices.

2. The method of claim 1, wherein the first devices include one or more peripheral components associated with the computer.

3. The method of claim 1, wherein the peripheral component is selected from a group consisting of a composite device, a root hub, a USB port, and a controller.

4. The method of claim 1, wherein the first devices each have an active state and an idle state and wherein the first devices are each ready to be suspended when in the idle state.

5. The method of claim 1, wherein the nodes in the tree are connected via a Universal Serial Bus.

6. The method of claim 1, wherein propagating the idle request comprises propagating the idle request by inductively traversing the tree structure from the at least one of the first devices to the the root hub.

7. The method of claim 1, wherein propagating the idle request comprises transmitting the received idle request from the at least one of the first devices to another one of the first devices if the at least one of the first devices is ready to be suspended and has received an idle request from all of the child nodes thereof.

8. The method of claim 1, wherein sending an idle request comprises transmitting an input/output control (IOCTL) request from the at least one of the first devices to the root hub.

9. The method of claim 8, wherein transmitting the IOCTL request comprises transmitting an input/output request packet from the at least one of the fist devices to the root hub.

10. The method of claim 1, further comprising receiving, by the at least one of the first devices, the call from the root hub to the callback function associated therewith and suspending the at least one of the first devices in response to execution of the received callback function.

11. The method of 10, further comprising waking the at least one of the first devices.

12. The method of 11, wherein waking occurs in response to the at least one of the devices signaling the root hub that the at least one of the first devices is ready to be awakened.

13. The method of claim 11, wherein waking occurs in response to the root hub signaling the at least one of the first devices to wake.

14. The method of claim 11, wherein the at least one of the first devices comprises one of a plurality of nodes organized in a tree structure, wherein the at least one of the first devices has one or more child nodes, and wherein waking occurs in response to at least one of the child nodes signaling the at least one of the first devices to wake.

15. The method of claim 11, wherein waking comprises resetting the sent idle requests.

16. The method of claim 1, further comprising sending a cancel request from the at least one of the first devices to the root hub when the at least one of the first devices is no longer ready to be suspended, said sending a cancel request occurring after sending the idle request.

17. The method of claim 1, further comprising another device sending an idle request to the root hub when the other device is ready to be suspended and suspending simultaneously with the at least one of the first devices, said other device having input/output control and function independent from the at least one of the first devices.

18. One or more computer readable media having computer-executable instructions for performing the method recited in claim 1.

19. A method for suspending a tree of devices, said tree comprising one or more devices hierarchically organized as parent devices and child devices, said tree further comprising a universal serial bus (USB) hub controller at a root of the tree, said method comprising:
receiving, by the USB hub controller, an idle request from one of the devices in the tree when the device is ready to be suspended; and
suspending, by the USB hub controller in response to the received idle request, the device and any child devices thereof only when an idle request has been received from the device and all of the child devices thereof such that the device and all child devices thereof are suspended while a state associated with each of the other devices in the tree is maintained, whereby idle request from each of the child devices propagates through the tree from the parent device to the USB hub controller.

20. The method of claim 19, wherein receiving an idle request comprises receiving, by the USB hub controller, an idle request from one OT more of the child devices via software for controlling the child devices.

21. The method of claim 19, wherein suspending comprises executing a callback function for all of the child devices to put all of the child devices into a low power mode.

22. The method of claim 19, wherein the parent devices and the child devices are connected via USB, wherein one of the parent devices comprises a USB hub and wherein one of the child devices connects to a port of the USB hub, and further comprising selectively suspending, by the USB hub controller, the USB hub.

23. The method of claim 19, further comprising a computer, said computer including the USB hub controller, wherein the parent devices and the child devices are connected via USB, and further comprising suspending, by the computer, a USB host controller.

24. The method of claim 19, wherein receiving an idle request comprises receiving, by the USB hub controller, an input/output control (IOCTL) request from one or more of the child devices.

25. The method of claim 24, wherein receiving the IOCTL request comprises receiving, by the USB hub controller, an input/output request packet from the one or more child devices.

26. One or more computer readable media having computer-executable instructions for performing the method recited in claim 19.

27. The method of claim 19, wherein the state associated with each of the other first devices in the tree comprises an active state, an idle state, or a suspended state.

28. One or more computer-readable media having computer-executable components for signaling and waiting to suspend a device in a tree of devices, said tree comprising one or more devices hierarchically organized as parent devices and child devices, said tree having a root hub controller at a root of the tree, said components comprising:
a signaling component for sending an idle request from at least one child device to a parent device when the child device is ready to be suspended, wherein the idle request propagates through the tree from the parent device to the root hub controller; and
a driver component for waiting to receive, by the child device, a call from the root hub controller to a callback function associated with the child device to suspend the child device in response to execution of said callback function by the child device while a state associated with each of the other child devices is maintained.

29. The method of claim 28, wherein the signaling component receives an idle request from at least one child of the child devices, and wherein the signaling component sends the received idle request to the parent device.

30. The computer-readable media of claim 28, wherein the signaling component receives a call to a callback function from the root hub controller in response to the propagated idle request.

31. The computer-readable media of claim 30, wherein the driver component suspends the child device in response to execution of the callback function.

32. The computer-readable media of claim 31, wherein the driver component wakes the child device in response to activity by the child device or a signal from the parent device or both.

33. The computer-readable media of claim 28, wherein the callback function comprises a power down function for powering down the child device.

34. The computer-readable media of claim 33, wherein the power down function comprises a low power function for putting the child device into a low power mode.

35. The computer-readable media of claim 28, wherein the parent devices and child devices are connected via a Universal Serial Bus.

36. The computer-readable media of claim 28, wherein the signaling component sends a cancel request from the child device to the parent device in response to non-idle activity by the child device.

37. One or more computer-readable media having computer-executable components for asserting power control over a tree of devices by a root hub controller at a root of the tree, said tree comprising one or more devices hierarchically organized as parent devices and child devices in the tree, said tree and additional devices being associated with a computer, said components comprising:
- an interface component for receiving, by the root hub controller, an idle request from one of the devices in the tree when the device is ready to be suspended; and
- a controller component for suspending, by the root hub controller in response to the received idle request, the parent device and any child devices thereof while maintaining a state associated with each of the other devices in the tree, said suspending occurring only when an idle request has been received from the parent device and all of the child devices thereof such that the parent device and all child devices thereof are suspended independently of the other devices in the tree and independently of the additional devices, whereby the controller component does not suspend the additional devices and does not receive idle requests from the additional devices.

38. The computer-readable media of claim 28, wherein the root hub controller wakes the devices in the tree in response to activity by the root hub controller or any of the devices or both.

39. The computer-readable media of claim 28, wherein the child device comprises a Human Interface Device (HID).

40. The computer-readable media of claim 28, wherein the child device comprises a device embedded in a computer.

41. The computer-readable media of claim 28, wherein the parent devices and child devices are connected via a Universal Serial Bus.

* * * * *

UNITED STATES PATENT AND TRADEMARK OFFICE
CERTIFICATE OF CORRECTION

PATENT NO. : 7,103,788 B1  
APPLICATION NO. : 10/003338  
DATED : September 5, 2006  
INVENTOR(S) : Joseph G. Souza et al.

It is certified that error appears in the above-identified patent and that said Letters Patent is hereby corrected as shown below:

In column 5, line 52, delete "media Computer" and insert -- media. Computer --, therefor.

In column 6, line 30, delete "FIG. 1" and insert -- FIG. 2 --, therefor.

In column 6, line 32, delete "FIG. 1" and insert -- FIG. 2 --, therefor.

In column 7, line 27, after "184" insert -- , --.

In column 7, line 31, delete "FIG. 1" and insert -- FIG. 2 --, therefor.

In column 16, line 19, in Claim 1, delete "an" and insert -- any --, therefor.

In column 16, line 57, in Claim 6, after "the" delete "the".

In column 17, line 3, in Claim 9, delete "fist" and insert -- first --, therefor.

In column 17, line 60, in Claim 20, delete "OT" and insert -- or --, therefor.

In column 20, line 5, in Claim 38, delete "claim 28," and insert -- claim 37, --, therefor.

In column 20, line 9, in Claim 39, delete "claim 28," and insert -- claim 37, --, therefor.

In column 20, line 11, in Claim 40, delete "claim 28," and insert -- claim 37, --, therefor.

In column 20, line 15, in Claim 41, delete "claim 28," and insert -- claim 37, --, therefor.

Signed and Sealed this

Twenty-seventh Day of July, 2010

David J. Kappos
*Director of the United States Patent and Trademark Office*